(No Model.)
F. I. MAULE.
STRAINER.
No. 444,246.
Patented Jan. 6, 1891.
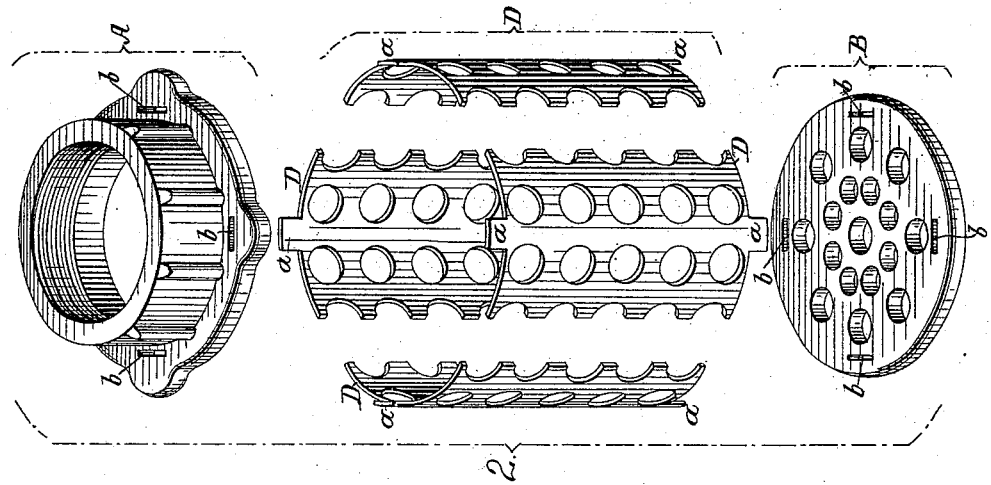
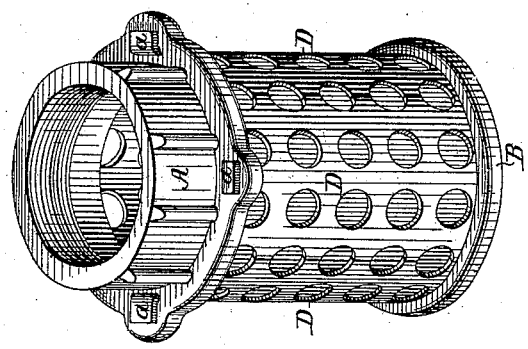
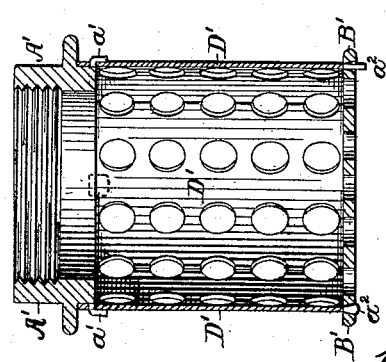
Witnesses
A. V. Groupe.
Murray E. Boyer.
Inventor:
Francis I. Maule
by his Attorneys
Howson & Howson

UNITED STATES PATENT OFFICE.

FRANCIS I. MAULE, OF PHILADELPHIA, PENNSYLVANIA.

STRAINER.

SPECIFICATION forming part of Letters Patent No. 444,246, dated January 6, 1891.

Application filed October 27, 1890. Serial No. 369,408. (No model.)

*To all whom it may concern:*

Be it known that I, FRANCIS I. MAULE, a citizen of the United States, and a resident of Philadelphia, Pennsylvania, have invented certain Improvements in Strainers, of which the following is a specification.

The object of my invention is to so construct a strainer for the inlet-pipes of pumps and for analogous uses that the making of the same will be facilitated and cheapened; and this object I attain in the manner hereinafter set forth, reference being had to the accompanying drawings, in which—

Figure 1 is a perspective view of a strainer constructed in accordance with my invention. Fig. 2 is a perspective view showing the parts of the strainer detached from each other, and Fig. 3 is a sectional view illustrating certain modifications of my invention.

Various devices for attachment to the inlet-pipes of pumps or other pipes for the purpose of preventing leaves, sticks, and other refuse from entering the same have been proposed and are known to the trade under the general name of "strainers," the commonest form of such strainer consisting of a hollow metal cylinder with perforated side walls, said cylinder being closed at the bottom and provided at the upper end with a screw-thread, whereby it is connected to the pipe. Such strainers have usually been made in a single piece of cast-iron; but the great care required in molding them and the necessity for using elaborate cores for such molding have rendered them expensive, and to this is added the liability of the perforations to become filled or partially filled with metal in casting, so as to necessitate subsequent drilling of many of said perforations. Hence these objections have been serious drawbacks to their manufacture in this way.

In carrying out my invention I make the strainer in sections—that is to say, it comprises a top or cap piece A, a bottom piece B, and a series of body-sections D, each shaped to correspond with the desired shape of said body portion of the strainer. For instance, if the latter is cylindrical, each of the body-sections will be of segmental form, as shown in Fig. 2 of the drawings. Each of said body-sections, and by preference the bottom plate also, of the strainer is perforated; but these perforations will not interfere with the ready casting of the parts without cores, as said parts can be molded flatwise. Hence special skill in molding is not required, and the work can be performed at much less expense than the ordinary molding operations involved in the manufacture of this class of work. Moreover, the perforations will be uniform and of full area, and the bottom end plate, as well as the body-sections, can be perforated, whereas in a strainer cast in one piece the perforation of the bottom is considered impracticable.

Each of the body-sections of the strainer has at top and bottom a projecting lug or tang $a$, and in the top and bottom pieces of the strainer are formed slots $b$, which, when the parts are properly fitted together, receive the lugs or tangs $a$ of the body-sections, these lugs being of such length as to project beyond the bottom plate and beyond the flange of the cap or top piece, so that the projecting portions can be bent down, as shown in Fig. 1, for instance, in order to firmly confine said top and bottom pieces to the body, it being understood, of course, that the body-sections are made of malleable iron, cast-steel, or other metal which will permit such bending of the lugs.

If desired, the construction may be modified by forming laterally-projecting lugs or tangs upon the top and bottom pieces of the strainer, these tangs being passed through slots in the body-sections and bent down beyond the same, or the tangs of the body-sections may be upset or hammered into countersunk recesses in the top and bottom pieces. Both of these modifications are illustrated in Fig. 3, in which A' represents the top piece, having tangs $a'$ passing laterally through slots in the body-sections D' and bent down beyond the same, and $a^2$ represents tangs on the body-sections upset or hammered down into undercut recesses in the bottom end piece B'.

I am aware that it has been proposed to make a strainer having a head composed of semi-tubular halves, each carrying one-half of the bottom piece, these halves being clamped together and to the pipe by a transverse bolt and each half having a central row of perforations and notched edges forming parts of two other rows; but by making the body of the strainer independent of the top and bottom pieces, and securing the parts together in the manner which I have hereinbefore set forth I am enabled to make the body in as many sections as desired, and I can perforate each section of the body throughout its entire extent without interfering with the casting of said sections, and am also enabled to perforate the bottom end piece.

Having thus described my invention, I claim and desire to secure by Letters Patent—

The within-described strainer, consisting of a top end piece, a perforated bottom end piece, and a series of body-sections perforated throughout, said body-sections and end pieces being secured together by malleable lugs formed on one part and adapted to recesses in the other part, substantially as specified.

In testimony whereof I have signed my name to this specification in the presence of two subscribing witnesses.

FRANCIS I. MAULE.

Witnesses:
 EUGENE ELTERICH,
 HARRY SMITH.